United States Patent

[11] 3,593,357

| [72] | Inventor | Dale R. Oldham<br>Phoenix, Ariz. |
|---|---|---|
| [21] | Appl. No. | 703,405 |
| [22] | Filed | Feb. 6, 1968 |
| [45] | Patented | July 20, 1971 |
| [73] | Assignee | Earl Dallas Smith<br>Phoenix, Ariz. |

[54] SEPARATELY DRIVEN WINDOW AND SIDE BRUSHES ON COMMON FRAME
8 Claims, 7 Drawing Figs.

[52] U.S. Cl. ................................................. 15/21
[51] Int. Cl. ................................................. B60s 3/06
[50] Field of Search ...................................... 15/21 D, 21
C. 53.97, 320

[56] References Cited
UNITED STATES PATENTS

| 2,705,810 | 4/1955 | McDermott | 15/21 (C.3) |
|---|---|---|---|
| 3,403,417 | 10/1968 | Hanna et al. | 15/21 (C.3) |
| 3,438,077 | 4/1969 | Eubanks | 15/21 (C.0) |
| 3,443,270 | 5/1969 | Smith | 15/21 (C.3) |

*Primary Examiner*—Edward L. Roberts
*Attorney*—Woodard, Weikart, Emhardt & Naughton

ABSTRACT: Vehicle-cleaning brush arrangement of a body and fender side brush rotatable by one hydraulic motor on a first axis on a brush frame, and a window brush rotatable on a second axis by a second motor on the brush frame. A vertical pivot for the brush frame enabling swinging thereof in a horizontal arc for body brush action on portions below the vehicle "belt line," and independent window brush action on portions above the belt line, the window brush being above the body brush and the axis therefore being inclined from vertical. A windshield sensing wand operable to start rotation of the window brush and terminate rotation thereof. Window brush load sensing means enable brushing the back window of station wagons regardless of termination of sensing wand actuation.

INVENTOR
Dale R. Oldham

INVENTOR
Dale R. Oldham

INVENTOR
Dale R. Oldham 3,593,357

SEPARATELY DRIVEN WINDOW AND SIDE BRUSHES ON COMMON FRAME

BACKGROUND OF THE INVENTION

1. Field of the Invention

This invention relates generally to vehicle-washing apparatus, and more particularly to a type employing rotating brushes in direct contact with the vehicle surfaces, and controllable to avoid damage.

2. Description of the Prior Art

Varieties of brush arrangements have been devised for cleaning vehicles of various sizes and types. One such brush arrangement is disclosed in the U.S. Pat. to Holmes, No. 2,318,995. However, the utility of arrangements already known has been limited, and in the Holmes patent, for example, the brushes can wash side surfaces but nothing else.

In automobile carwashing operations, it is desirable to be able to adequately brush all of the variously located and shaped external surfaces with as few brushes as possible, and without damage to any appendages on the vehicle, but with minimal attention from an operator.

SUMMARY

Described briefly, in a typical embodiment of the present invention, a brush-mounting arm is provided with a pivotal axis at one end to enable the brushes at the other end to swing in a horizontal arc. The brushes include one rotatable on a vertical axis at the swinging end of the arm and at an elevation for washing side and rear body surfaces of the car. The other brush is mounted above the one and is disposed for rotation on an axis intersecting that of the body side brush but slightly inclined to better wash side windows of a car and rear windows of station wagons and panel trucks. The body brush is driven continuously by a hydraulic motor, whereas the window brush is driven by another hydraulic motor only when the side and rear windows are accessible, and a windshield sensor is typically used to initiate rotation of the window brush. Suitable controls are provided in the illustrated embodiment to continue operation of the window brush so long as it is working on window surfaces, although the wand may have departed from the vehicle top before this occurs. It thus enables continued washing of rear windows of station wagons even though the sensor wand has dropped from the roof of the vehicle.

BRIEF DESCRIPTION OF THE DRAWING

The full nature of the invention will be understood from the accompanying drawings and the following description and claims.

DESCRIPTION OF THE PREFERRED EMBODIMENT

Figure 1:
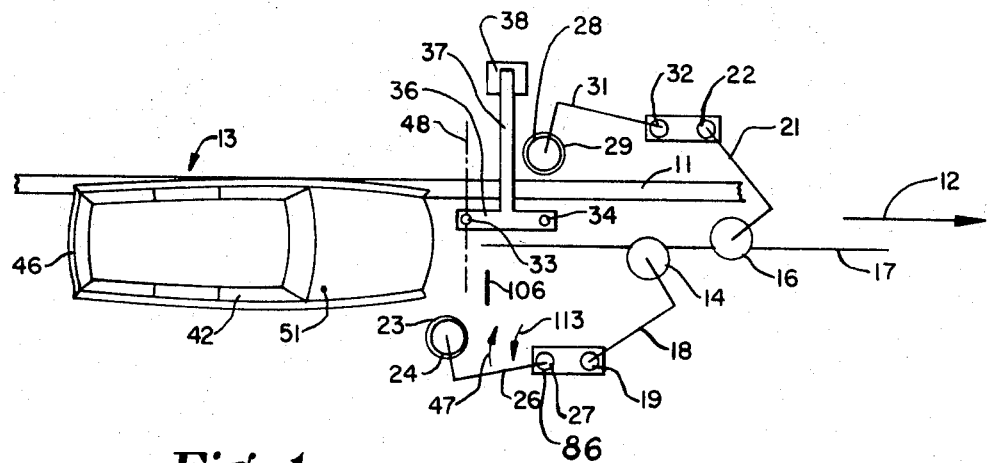
FIG. 1 is a schematic top plan view of an installation employing apparatus according to a typical embodiment of the present invention.

Referring now to the drawings in detail, and particularly FIG. 1 therein, a portion of a carwash establishment is shown. It includes a conveyor 11 for moving vehicles therethrough in the direction of the arrow 12, a station wagon 13 being shown, for example. Two brushes 14 and 16 are disposed near the centerline 17 of the path of the car, brush 14 being mounted for rotation on an arm 18 pivotally mounted on a vertical axis at 19. Similarly brush 16 is rotatable on a vertical axis on the arm 21 pivotally mounted on a vertical axis at 22. These two brushes, being constantly urged toward the center of the path, are effective to clean the front end and the sides of the car as it is moved along in the direction of arrow 12. To further clean the sides and also the windows and rear end of the car, additional brushes are employed according to the present invention, and these include brushes 23 and 24 mounted for rotation on the arm 26 which is pivotally mounted on a vertical axis 27. Also included are brushes 28 and 29 mounted for rotation on an arm 31 pivotally mounted on a vertical axis at 32. Two sensor wands extend vertically downward from the points 33 and 34 where they are mounted on an overhead support member 36 located as shown by an arm 37 extending over the path of the car from a post 38 mounted to the floor.

Figure 3:
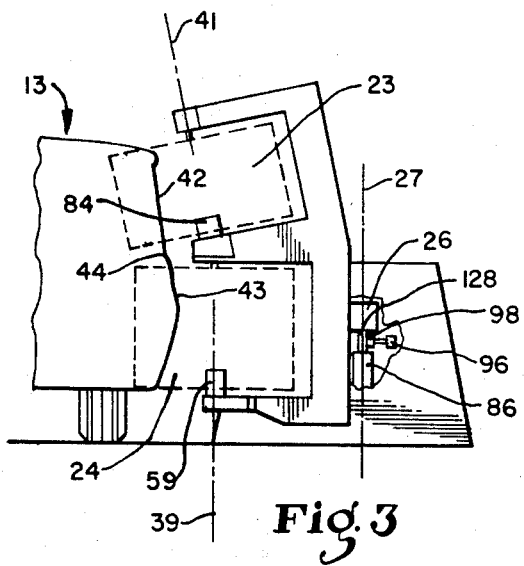
FIG. 3 is a further enlarged schematic fragmentary elevational view taken at line 3-3 in FIG. 2 and viewed in the direction of the arrows.

As better shown in FIG. 3, brush 23 is mounted above brush 24 and whereas the latter is rotatable on a vertical axis 39, the former is rotatable on an axis 41 intersecting but inclined approximately 15° with respect to axis 39. Accordingly brush 23 is disposed to best clean the side windows 42 of the car which are usually inclined at a similar angle. Brush 24 is disposed to best clean the vehicle body side 43 below the "belt line" 44, as well as the rear end 46 (FIG. 1) of the body when the brush arm 26 swings inwardly in the direction of the arrow 47 toward the centerline of the path. Where the car is a station wagon, the window brush 23 is able to clean the back window while the body brush cleans the rear end of the car body, according to one feature of this invention.

Figure 2:
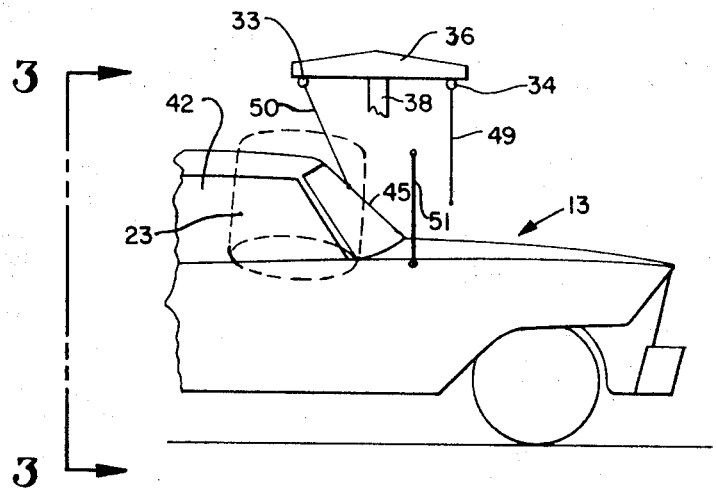
FIG. 2 is an enlarged schematic fragmentary elevational view taken at line 2-2 in FIG. 4 and viewed in the direction of the arrows.
Figure 4:
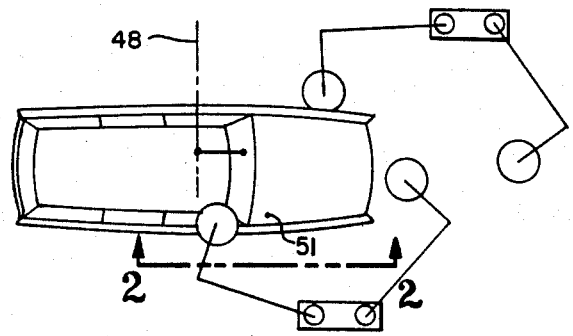
FIG. 4 is a schematic top plan view like FIG. 1 but showing the car advanced by the conveyor to the position of FIG. 2.

Referring now more particularly to FIGS. 2 and 4, the car 13 is shown at a later stage in the operation wherein the windshield 45 has moved wand 50 forward about a horizontal axis 48 (FIGS. 1 and 4). Wand 49 remains in its vertical position until reached by the windshield. It controls the left-hand window brush 28. Sensor means other than wands, including photoelectric devices, might also be used. The radio antenna 51 of the car is also shown and brush 23 is shown in the dotted outline.

Figure 7:
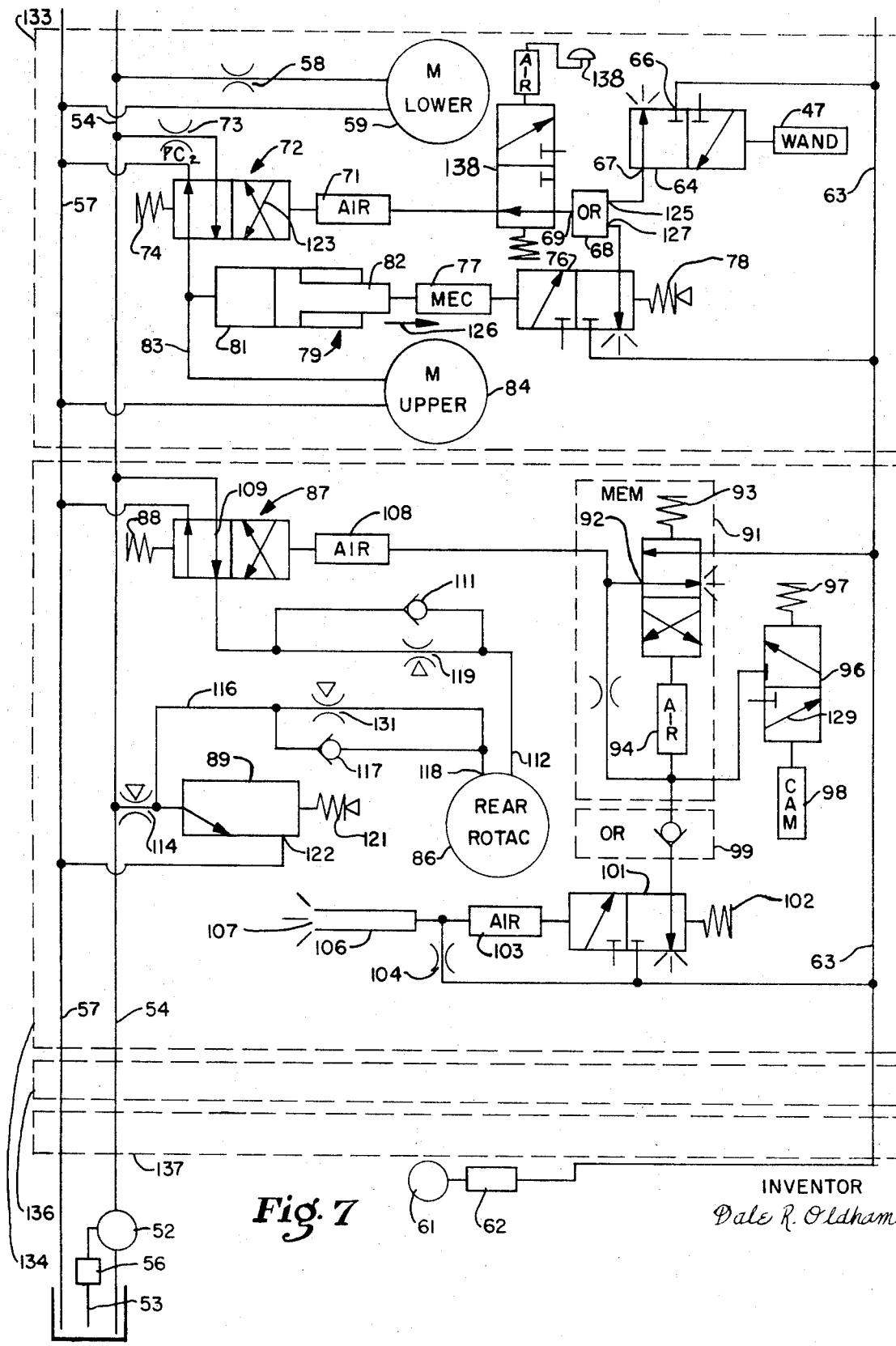
FIG. 7 is a schematic pneumatic-hydraulic diagram of the system.

Referring now to FIG. 7, pump 52, drawing hydraulic fluid from the reservoir 53, provides a supply of hydraulic fluid under pressure on line 54, the pressure limit being determined by a pressure relief valve 56 normally set at approximately 1,000 pounds per square inch (p.s.i.). Line 57 is a return line to the sump. Hydraulic power is thereby supplied through a pressure-compensated flow control valve 58 to the hydraulic motor 59 which drives brush 24. This brush is not only capable of cleaning the right side of the body of the vehicle but also a large portion of the rear end of the vehicle, as will be shown hereinafter, so it is called the right rear lower brush. The flow controller 58 is intended to establish a constant brush speed regardless of load thereon.

A supply of compressed air is provided from the compressor 61 through a filter, regulator, and lubricator assembly 62 to line 63. For control of the upper brush 23, an air switch 64 has an output at 66 connected to line 63 and an output at 67 connected to an input of the "OR" logic device 68. The output 69 of the device 68 is connected to the pilot 71 of the pilot-operated spring-return two-position hydraulic control valve 72 having one port connected through a pressure-compensated flow controller 73 to the hydraulic supply line 54. This valve is normally maintained in the position shown by the spring 74.

Another air switch 76 is provided and has a mechanical actuator member 77 and return spring 78, the latter normally keeping the switch in the position shown. An actuator 79 for this switch is provided in the form of a hydraulic cylinder 81 with a piston rod 82 engageable with the actuator 77 as pressure rises in line 83 supplying the hydraulic drive motor 84 for the upper brush 23.

To move arm 26 in the direction of arrow 47 in FIG. 1, some additional apparatus is employed including a rotary actuator 86 shown schematically in FIG. 1 and in FIG. 7, along with some additional control circuitry. There is included a two-position, pilot-actuated, spring-return hydraulic valve 87 normally maintained in the position shown by the spring 88. There is also an adjustable relief valve 89 associated with actuator 86. A logic memory device 91 is provided including therein an air switch 92 normally maintained in the position shown by spring 93 but having a pilot 94 associated with an air switch 96 normally maintained in its position shown by spring 97 but movable therefrom by a cam 98.

The memory device 91 has an input thereto from the OR device 99 having an input line from the air switch 101 normally disposed in the condition shown by return spring 102 but movable to another switched condition by the air pilot 103 associated with an orifice 104 and constantly bleeding street switch actuator hose 106 (also FIG. 1).

OPERATION

With the compressor and hydraulic pump operating, all brushes except the window brushes are rotated. The motors and rotary actuators for the brushes 14 and 16 and their respective support arms are not shown and described because they are not a part of this particular invention. The brushes employed are typically made of metal cores with flexible plastic bristles thereon of a type well known in the art. These bristles collapse when the brushes are not rotated so that FIG. 1 the outline of the upper two brushes 23 and 29 can be considered that of collapsed brushes, whereas the outline of the other two brushes is that of the brushes as rotating.

As the conveyor 11 moves the car along in the direction of the arrow 12, the right front wheel passes over the hose 106. This shuts off the flow of air therethrough out the open end at 107 to cause a rise in pressure at the pilot 103 shifting the valve 101 to connect the air supply line 63 through the OR logic device 99 to the pilot 94 of the memory device. The air switch thereof thereupon connects the air supply to the pilot 108 of valve 87 causing it to shift against the load of the spring 88. Prior to this time, the hydraulic pressure has been applied from line 54 through passageway 109 of this valve and through check valve 111 to the one input 112 of the rotary actuator 86. Application of pressure at this input 112 tends to operate the rotary actuator in the direction of the arrow 113 holding the arm 26 out against a stop so that it does not interfere with advance of the car in the direction of the arrow 12. However, by the time that the right front tire contacts the street switch 106, the right front fender of the car is aligned with the brush 24 so that the brush can now be moved inward in the direction of arrow 47 without harm.

Upon shifting of valve 87 by the pilot 108, pressure is applied from hydraulic supply line 54 through restriction 114, line 116, check valve 117 to the other port 118 of the rotary actuator 86. This urges the actuator in the opposite direction so that the arm 26 is moved inward toward the front fender of the car in the direction of arrow 47. The speed of this motion depends both upon the pressure in line 116 and the adjustment of the speed controller 119. The pressure provided at the advance port 118 is determined by the adjustment at spring 121 on the relief valve 89. When the desired pressure in line 116 is reached, the valve moves to a position venting through the outlet 122 returned to the tank through line 57. The setting of the restriction 114 prevents excessive pressure loss in line 54 by bleeding at valve 89. The force of application of the brush 24 to the side of the car is determined by the pressure in line 166. The valve 89 may therefore be referred to as the brush "crush" control.

When the car has moved to the point where the windshield engages wand 50, it begins to move the wand forward. The pivotal axis of this wand is normally aligned transversely with the window brush 23. When the lower end of the wand has been moved forward as the wand is pivoted on axis 48 by the windshield, at a certain point determined by suitable adjustment, the air switch 64 (FIG. 7) is shifted to a position connecting the air supply line through the OR gate to the valve pilot 71 shifting this valve to the position where supply line 54 is connected through passageway 123 to the upper brush drive motor 84. Rotation of the upper brush is thereby initiated and, because of the fact that the antenna 51 is usually well ahead of the point on the windshield which actuates the wand 50, and the fact that the wand actuation of air switch 64 can be adjusted as desired, there is no chance that antenna 51 will be struck by the bristles of the brush 23 when they extend upon rotation. So long as air pressure remains on the pilot 71 from the OR device 68, brush 23 will continue to rotate and wash the side windows. In the illustrated embodiment of this invention, this characteristic is used in combination with the OR device to enable the upper brush to wash the rear window of station wagon or panel-bodied vehicles. For this purpose, the pressure-responsive actuator 79 and air switch 76 are used in a manner which will now be described.

Figure 5:
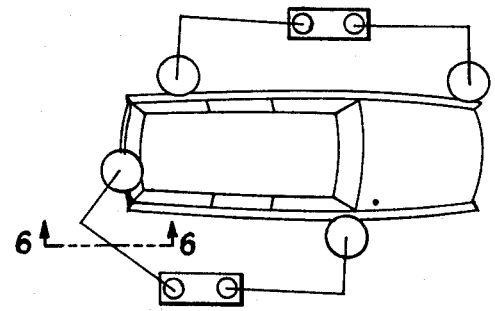
FIG. 5 is a schematic top plan view like FIG. 4 but showing the car further advanced to the position of FIG. 6.
Figure 6:
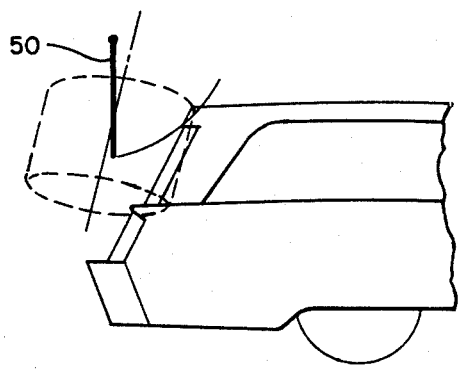
FIG. 6 is an enlarged schematic fragmentary elevational view taken at line 6-6 in FIG. 5 and viewed in the direction of the arrows.

Spring 78 of air switch 76 normally maintains the switch in the condition shown wherein the supply line 63 thereto is blocked and one of the OR device inputs is vented. A hydraulic cylinder 81 is connected to the supply line 83 for the upper brush drive motor 84 so that the pressure therein urges the piston rod 82 thereof in the direction of arrow 126. This rod is normally engaged with a cam follower roller and plunger shown schematically at 77 on the air switch 76, and movement thereof in the direction of arrow 126 is resisted by spring 78. However, if there is certain minimal level of potential (pressure in this example) applied to the brush drive motor, rotation will be maintained. In this example, when brush-motor-operating pressure is available under the piston in cylinder 81, the piston thereof will move the switch to its second switched position whereupon air pressure from line 63 will be applied through the switch to the OR input 127 causing an output at 69 to the air pilot 71. The pressure in line 83 depends upon whether or not the brush is working on the vehicle. As the car is moved along by the conveyor, the arm 26 is urged in the direction of arrow 47 by the rotary actuator 86. Consequently the brush will continue working across the rear window of a station wagon as shown in FIGS. 5 and 6, so that the pressure in line 83 remains higher than it would be if the brush no longer engaged any surface of the vehicle. By suitable adjustment of the tension of spring 78, this pressure can be selected at whatever level is needed to assure that the brush will remain operating across the rear window of the wagon, even though the wand 50 may have dropped from the roof as shown in FIG. 6, and permitted the switch 64 by its monostable action to return to stable state and again shut off the supply to the OR gate input 125. After the car has been advanced far enough along the conveyor to remove it from the brush 23, the pressure in line 83 drops and the spring 78 returns the switch to its initial position, whereupon the air supply to pilot 71 is removed and spring 74 returns valve 72 to its initial condition terminating the hydraulic fluid supply to the motor 84, whereupon the brush stops.

In the situation where the car has a sedan or coupe body, the load on the upper brush terminates as soon as the body portions above the belt line have passed, Likewise, the wand 50 has normally dropped from the roof of the car by this time so that in the absence of actuation by the wand or by load on the brush, valve 72 returns to initial position and the brush stops. This avoids any chance of damage by this particular brush to antennas mounted on rear fenders of the car.

As the rotary actuator 86 moves the arm 26 and thereby the brushes 23 and 24 toward the center of the path of the car, the shaft 128 (FIG. 3) connecting the actuator to the arm 26 rotates on axis 27. At a position wherein the brushes are near the center of the path of the car, the cam 98 mounted on the shaft shifts the air switch 96 from the position shown in FIG. 7, against the bias of spring 97, to a position venting the pilot 94 through passageway 129 of the switch. This permits return of the advance switch in memory 91 to the position shown in FIG. 7, venting the pilot 108 of directional valve 87. Spring 88 then returns this valve to its position shown in FIG. 7 whereupon line pressure is applied through passageway 109 and check valve 111 to the return (retract) port 112 of the rotary actuator 86. Because this pressure exceeds that in the line 116 to the advance port 118, reversal of the rotary actuator and return of the arm 26 in the direction of arrow 113 takes place. The speed of retraction of the arm is determined by the setting of the retract speed controller 131. Valve 89 permits return of fluid from the advance line 116 to the tank return line 57, as pressure at port 112 forces the reversal of the actuator.

As shown in FIG. 7, the motors for the upper and lower brushes 23 and 24 for the right side of the car path, as well as the control elements for the upper brush, are shown in the dotted outline 133. Similarly, the rotary actuator and controls therefor associated with arm 26 are enclosed within a dotted outline 134. The components for the upper and lower lefthand brushes 28 and 29, respectively, are like those in the boxes 133 and 134 for the right side, so there is no need to show them in detail. They are represented schematically on FIG. 7 in boxes 136 and 137 corresponding to boxes 133 and 134, respectively, but for the left-hand side.

From the foregoing description it will be apparent that the upper-brush-holding feature for station wagon rear windows can be eliminated, if desired, by simply closing the input 127 of the OR device 68, and deleting the items associated with that input. As a result, operation of the upper brush will terminate when the sensor wand descends the slope of the rear window, or drops from the roof of the vehicle, as the case may be. It can also be terminated at will by pushing the "stop" button 138 which shifts air switch 139 to position blocking OR output 69 and venting the pilot 71, permitting spring 74 to return valve 72 to its initial position.

Among the advantages of the present invention are the simplicity and reliability of the system, and the fact that all pneumatic and hydraulic controls and motors are readily available, off-the-shelf items. Examples of some of the devices are logic elements by ARO of Bryan, Ohio; air switches by Modernaire of Angola, Indiana; rotary actuators ("Rotac") by Ex-Cell-O Corp. of Greenville, Ohio; and directional valves by Double A or Vickers.

While the invention has been disclosed and described in some detail in the drawings and foregoing description, they are to be considered as illustrative and not restrictive in character, as other modifications may readily suggest themselves to persons skilled in this art and within the broad scope of the invention, reference being made to the appended claims.

The invention I claim is:

1. The combination comprising:
a first vehicle-cleaning member;
drive motor means coupled to said cleaning member;
sensor means associated with the path of a vehicle body portion;
a source of energy for said motor means;
first control means coupled to said sensor means and responsive to activation thereof by said vehicle body portion to couple said source to said motor means to drive said cleaning member; and
second control means responsive to potential of energy at said motor means above a predetermined level to thereupon maintain coupling of said source to said motor means independent of said first control means.

2. The combination of claim 1 wherein:
said first and second control means are monostable.

3. The combination comprising:
a first vehicle-cleaning member;
drive motor means coupled to said cleaning member;
sensor means associated with the path of a vehicle body portion;
a source of energy for said motor means;
first control means coupled to said sensor means and responsive to activation thereof by said vehicle body portion to couple said source to said motor means to drive said cleaning member; and
mounting arm means having a distal end portion swingable in a generally horizontal plane, said first cleaning member being mounted to said arm means at said distal end portion;
a second vehicle-cleaning member mounted to said distal end portion below said first cleaning member;
second drive motor means coupled to said energy source and to said second cleaning member and continuously driving said second cleaning member, both when said first cleaning member is driven and when said first cleaning member is at rest;
said first cleaning member including a first brush rotatable on a first axis on said arm,
said second cleaning member including a generally circular second brush rotatable on a second axis on said arm,
said second axis being generally vertical, and said first axis extending upwardly and inwardly toward the center of said path at an angle between three and 30° with respect to vertical.

4. The combination of claim 3 wherein:
said first cleaning brush is at the elevation of automobile side windows and said second cleaning brush is at the elevation of automobile body and fender sides.

5. The combination comprising:
a first vehicle-cleaning member;
drive motor means coupled to said cleaning member;
sensor means associated with the path of a vehicle body portion;
a source of energy for said motor means;
first control means coupled to said sensor means and responsive to activation thereof by said vehicle body portion to couple said source to said motor means to drive said cleaning member; and
said first cleaning member being a brush;
said drive motor means being a hydraulic motor;
said sensor means including a wand disposed in the path of a vehicle windshield;
said energy source being a hydraulic fluid pressure supply;
and said first control means including a first control valve coupled to said supply and to said motor and to said wand,
said first valve being a pilot-operated, spring-return two-position valve having a first position blocking the flow of fluid from said supply to said motor;
said first control means further comprising an air switch connected to said wand and to an air supply, said switch being operable when actuated by movement of said wand by a vehicle windshield to apply air from said air supply to the pilot of said first valve to move said valve to a second position connecting said hydraulic fluid supply to said motor.

6. The combination of claim 5, said control means further comprising:
an OR gate between said switch and said pilot and having a first input from said switch and a first output to said pilot, and a second input, said gate being responsive to introduction of air to either of said inputs to convey the introduced air to said output thereof;
a second air switch connected to said air supply;
a spring-loaded actuator responsive to pressure above a predetermined level at said motor to actuate said second air switch, said second air switch being operable, when actuated, to apply air to said second input of said OR gate for application from said output thereof to said pilot, to thereby continue brush drive independent of said wand so long as pressure at said motor remains above said level.

7. The combination comprising:
a first vehicle-cleaning member;
drive motor means coupled to said cleaning member;
sensor means associated with the path of a vehicle body portion;
a source of energy for said motor means;

first control means coupled to said sensor means and responsive to activation thereof by said vehicle body portion to couple said source to said motor means to drive said cleaning member; and a mount;

an arm pivotally connected to said mount and having said cleaning member thereon;

reversible actuator means connected to said mount and to said arm;

biasing means coupled to said source and normally applying potential from said source to said actuator means to keep said cleaning member at the side of said vehicle path;

and trigger means coupled to said biasing means and responsive to attainment by the vehicle on the path of a predetermined position with respect to said cleaning member, to thereupon initiate reversal of said actuator means and urge said cleaning member toward the center of said path.

8. The combination of claim 7 wherein:

said actuator means include a hydraulically operable rotary actuator;

said biasing means includes:

a first directional valve having first and second positions and normally stable in said first position coupling hydraulic fluid from said source through a first check valve to a retract port of said actuation to keep said cleaning member at the side of said path, and having a second position coupling hydraulic fluid from said retract port through a first speed control in parallel with said check valve to a low-pressure line, a pressure regulator coupling fluid from said source at a reduced pressure through a second check valve to an advance port of said actuator to continuously urge said cleaning member toward the center of said path, a second speed control being provided in parallel with said second check valve;

a first air switch coupled to an air supply and normally venting an operating pilot of said first valve, and having a pilot operable when pressurized to place said switch in a second condition pressurizing the pilot of said first valve to move said valve to said second position;

a second air switch coupled to said air supply and to the pilot of said first switch and responsive to attainment, by said cleaning member, of a predetermined position in said vehicle path to vent the pilot of said first switch;

said trigger means including an air bleed hose coupled to said air supply and to the operating pilot of a third air switch coupled to said air supply and through a third check valve to the pilot of said first air switch, said hose being deformable by the vehicle tire rolling across it to sufficiently pressurize the pilot of said third switch to place said third switch in a second switched condition pressurizing the pilot of said first switch, to enable said actuator to move said cleaning member toward the center of said path.